United States Patent Office 3,522,083
Patented July 28, 1970

3,522,083
PHOSPHONITRILIC LAMINATING AND
MOLDING RESINS
James M. Maselli, Ellicott City, Md., assignor to
W. R. Grace & Co., New York, N.Y., a corporation of Connecticut
No Drawing. Original application Nov. 3, 1967, Ser. No. 680,339, now Patent No. 3,433,767, dated Mar. 18, 1969. Divided and this application Oct. 17, 1968, Ser. No. 778,906
Int. Cl. C04b 39/00
U.S. Cl. 117—126
1 Claim

ABSTRACT OF THE DISCLOSURE

A method of preparing resin laminates by impregnating a glass or carbon cloth with a phosphonitrilic resin and a curing system consisting of hexamethylenetetramine as a formaldehyde yielding source and freshly prepared magnesium hydroxide as a catalyst.

---

This application is a division of application Ser. No. 680,339, filed Nov. 3, 1967, now Pat. No. 3,433,767.

This invention relates to phosphonitrilic laminating and molding resins and in one particular aspect it relates to an improved catalytic system for the curing of these resins.

Phosphonitrilic resin prepared by condensing trimeric triphenyl phosphonitrilic chloride ($\phi$PNCl)$_3$ with hydroquinone and having the structural formula

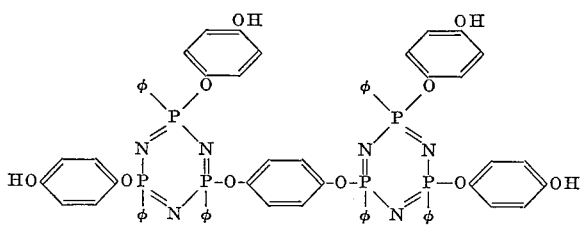

is described in a co-pending application, Ser. No. 652,710, filed July 12, 1967, now abandoned, which is a continuation-in-part of an earlier filed application, Ser. No. 359,786, filed Apr. 14, 1964, now abandoned.

Attempts to cure the above described resin by the addition of solid hexamethylenetetramine to the solid resin failed to give silica or carbon reinforced moldings or laminates which do not soften or blister at 500° F. Further reactions under alkaline conditions (sodium hydroxide) with one or more moles of formaldehyde per mole phenol fail to give "resole" type formulations. Refluxing the mixture of the above resin, formaldehyde, and hexamethylenetetramine in pyridine gave after vacuum distillation of the solvent an oily viscous resin which gelled in two minutes at 325° F. Although acceptable silica filled moldings and laminates could be made with this formulation, they also soften or extrude oily liquids at 500° F. Variations of "B" staging, cure time, post cure cycles, etc. fail to overcome the softening, blistering and reduction in physical properties at 500° F. Acid catalyzed condensations did not occur between formaldehyde and the above resin under a wide variety of conditions to give the expected "novolak" type intermediate. The addition of catalysts such as magnesium oxide, calcium oxide, barium oxide, arsenic pentoxide, boric acid do not significantly improve the curing of the resin.

It is therefore an object of this invention to provide a curing system for the production of improved laminating and molding resins from the reaction product of trimeric triphenyl phosphonitrilic chloride and hydroquinone.

It has been found that excellent reinforced phosphonitrilic laminates and moldings can be prepared by curing the above described resin in the presence of an "active" magnesium hydroxide.

It is a critical feature of this invention that the "active" magnesium hydroxide be "freshly prepared" before use in the curing system. The magnesium hydroxide of this invention may be prepared by (a) the addition of excess concentrated ammonium hydroxide solution to an aqueous solution of magnesium acetate or, alternately, (b) by the addition of an alkali hydroxide such as sodium hydroxide as an aqueous solution to soluble magnesium salt such as magnesium chloride. The magnesium hydroxide thus formed is washed several times with water to remove the soluble salt such as ammonium acetate, (a), or sodium chloride, (b). The water is substantially removed from the magnesium hydroxide gel by several washes with ethanol. The water free "active" magnesium hydroxide ethanol paste is then ready for use as a curing agent for the above described resin.

It is believed that resin described above is less reactive than standard phenolics and as such, requires an extremely reactive alkaline catalyst for crosslinking.

The amount of the Mg(OH)$_2$ catalyst necessary for curing is from 1 to 10 parts by weight (p.b.w.) with 2 to 5 p.b.w. preferred.

The resin of this invention must also be cured with a formaldehyde yielding source such as formaldehyde, hexamethylenetetramine, paraformaldehyde and the like. The concentration of the formaldehyde source can be from 1 to 9 p.b.w.

The temperature reaction conditions for curing the resin described above are from 350 to 500° F., with 400 to 500° F. being the most satisfactory. Curing times range from 0.5 to 3 hours, with most cures taking place in from 0.5 to 1 hour.

When preparing laminates from the resin system carbon cloth or silica cloth may be used. If moldings are the ultimate object of the cure, pressures of from 200 to 2000 p.s.i. can be used depending upon the product desired.

Moldings and laminates prepared using the resin curing system of this invention are useful as high temperature insulation, ablative heat shields for missiles and rockets and the like.

The invention is illustrated by, but not limited to the following specific examples.

EXAMPLE I

Phenylphosphonitrilic polymers
[($\phi$PNCl)$_3$—Hydroquinone condensation product]

Trans-2,4,6-trichloro - 2,4,6 - triphenyltriphosphonitrile and hydroquinone were condensed together in benzene in the presence of pyridine (eq. 21). The resulting benzene insoluble oil was dissolved in glacial acetic acid. Addition of the glacial acetic acid solution to water precipitated the resin.

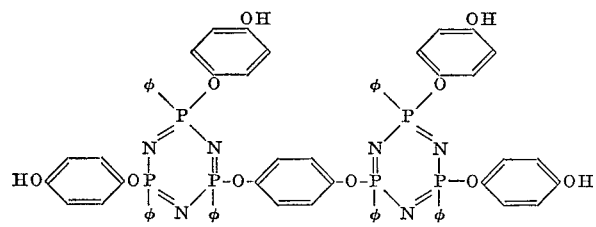

*Analysis.*—Calculated (percent): C, 62.10; H, 4.74; N, 6.59; P, 14.55; (OH), 5.57; Cl, 0.00; m. wt. 1277. Found (percent): C, 62.17; H, 4.48; N, 6.91; P, 15.16; (OH), 5.54; Cl, 0.00; m. wt. 1100 (Rast).

EXAMPLE II

Preparation of moldings

Moldings were made by thoroughly mixing together 70 parts by weight (p.b.w.) ground Refrasil silica fiber, 27 p.b.w. of the compound prepared in Example I and 3 p.b.w. hexamethylenetetramine. This mixture was placed in a mold 2 inches in diameter and ½ inch thick and compressed to 2000 p.s.i. The temperature was raised to 400° F. and held there for one hour. An additional hour at 500° F. completed the cure cycle. The moldings were removed from the mold at room temperature. Postcuring the samples by heating to 500° F. caused a black liquid exudate to appear and the moldings became soft and weak. Smaller molded discs 1″ x ¼″ also behaved in a similar manner. When held at 500° F. for fifteen minutes these discs began to expand and blister.

EXAMPLE III

Preparation of moldings with magnesium hydroxide catalyst

Finely ground Refrasil silica fiber (70 p.b.w.), the compound prepared in Example I (24 p.b.w.), hexamethylenetetramine (3 p.b.w.) and freshly precipitated magnesium hydroxide (3 p.b.w.) were mixed together in an automatic muller for 15 minutes until a fine uniform powder was obtained. The powder was staged for 15 minutes at 180° F. prior to molding.

The staged powder was placed in a 2 inch diameter by ¼ inch circular mold and compressed at 2000 p.s.i. The temperature was raised to 400° F. and maintained there for one hour. Curing was completed by heating the mold under pressure for an additional hour at 500° F. The moldings released easily from the mold (DC-4, Carnauba Wax mold release). Postcuring was accomplished in a vacuum fixture yielding 29 inches of mercury for 3 hours at 360° F., 16 hours at 410° F., 4 hours at 470° F. and ½ hour at 500° F.

Similar moldings were fabricated using ½ inch Refrasil fibers using the same formulation. The fibers were impregnated with an ethanol solution of the compound of Example I, hexamethylenetetramine and Mg(OH)$_2$, molded, cured and postcured as described above.

Both sets of moldings (ground fiber and ½ inch fiber) were of good quality and did not soften or produce an exudate at 500° F. The discs could be machined with no difficulty, indicating good structural integrity.

EXAMPLE IV

Refrasil silica cloth laminates

Compound of Example I (35 p.b.w.), 36.9% formaldehyde solution (26 p.b.w.) and hexamethylenetetramine (1 p.b.w.) were refluxed in pyridine (33.6 p.b.w.) for 3 hours at 96° C. The resin was filled with silica flour and impregnated on Refrasil fabric. The impregnated cloth had the following composition:

|  | G. |
|---|---|
| Resin at 47.7% solids | 64.2 |
| Silica flour | 7.5 |
| Refrasil fabric | 62 |

The impregnated fabric was "B" staged for 12 hours at 160° F., and cured for 30 minutes at 325° F., 200 p.s.i. The laminate was blistered and delaminated. The pressure was varied from 200 p.s.i. to 2500 p.s.i., and the temperature from 325° F. to 350° F. None of these attempts produced successful laminates.

Some of this material was held under vacuum for 16 hours and then further "B" staged for 30 minutes at 250° F. A laminate was cured for 1 hour at 325° F., 2000 p.s.i., but it blistered during postcure cycle "B."

EXAMPLE V

Silica cloth laminates

An alcohol solution of compound of Example I and hexamethylenetetramine was impregnated on Refrasil fabric. The impregnated fabric had the following composition:

|  | G. |
|---|---|
| Compound of Example I | 31.8 |
| Hexamethylenetetramine | 3.2 |
| Refrasil fabric | 65 |

The laminate was "B" staged for 10 minutes at 250° F., and cured for 1 hour at 350° F., 250 p.s.i., and cooled under pressure. The cured laminate was free of blisters. However, when subsequent laminates were removed at cure temperature, 400°–500° F., blistering occurred as soon as the pressure was released. Several attempts were made to alleviate this problem. The "B" staging, pressure, dwell time, cure time and removal temperature, were all varied. Laminates which were removed at the cure temperature blistered; if removed after cooling to room temperature, they were blister free but developed blisters during the following typical postcure cycle. 9 hours at 275° F., 8 hours at 300° F., 16 hours at 325° F., 4 hours at 350° F., 4 hours at 400° F., 2 hours at 450° F. and 4 hours at 500° F. Flexural strength (p.s.i.) were 18,400 at 75° F. and 7600 at 500° F.

EXAMPLE VI

Silica cloth laminates with magnesium hydroxide catalyst

Refrasil silica cloth was cut to 7 x 7 inch plies at 110° C. for several hours. Eight pieces of the silica cloth were dipped once into solution A, air dried, then "B" staged at 110° C. for 16 hours. The total pickup amounted to 37 p.b.w. All laminates modified by Mg(OH)$_2$ contained 2 to 3% MgO in the final laminate.

Solution A

Compound of Example I—140 g.
Hexamethylenetetramine—14 g.
Freshly prepared, fine size Mg(OH)$_2$ suspension—35 g.[1]
Ethanol—450 cc.

[1] Mg(OH)$_2$ was prepared by the addition of excess conc. NH$_4$OH to an aqueous solution of magnesium acetate. The Mg(OH)$_2$ was washed several times with water and filtered to remove the ammonium acetate. Ethanol washes removed the water from the hydroxide and finally the water free Mg(OH)$_2$ was suspended in ethanol using a Waring Blendor.

Eight of the prepregs were placed in a 7 x 7 x ⅛ inch mold, compressed at 1000 p.s.i. then cured for one hour at 400° F. and one hour at 500° F. Pressure (1000 p.s.i.) was maintained throughout the cure cycle. The press was cooled to room temperature and the laminate removed.

Postcuring was carried out in a vacuum oven using the following cycle. No blistering or softening occurred.

390° F. for 18 hours
430° F. for 4 hours
500° F. for ½ hour

Flexural strength (p.s.i.) was 21,455 at 75° F. and 15,880 at 500° F.

What is claimed is:

1. A method for preparing resin laminates which comprises impregnating a material selected from the group consisting of carbon cloth and silica cloth with a resin having the structural formula

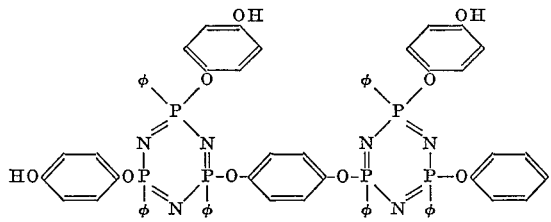

hexamethylenetetramine and freshly prepared magnesium hydroxide, curing the said impregnated cloth at temperatures from 350 to 500° F., at pressures from 200 to 2000 p.s.i. for 0.5 to 3 hours.

References Cited

UNITED STATES PATENTS 2,615,889   10/1952   Zerner et al.
3,087,919   4/1963   Wilkinson.
3,157,460   11/1964   Arthur et al.

ALFRED L. LEAVITT, Primary Examiner

W. F. CYRON, Assistant Examiner

U.S. Cl. X.R.

117—161; 260—57